Figure 1:
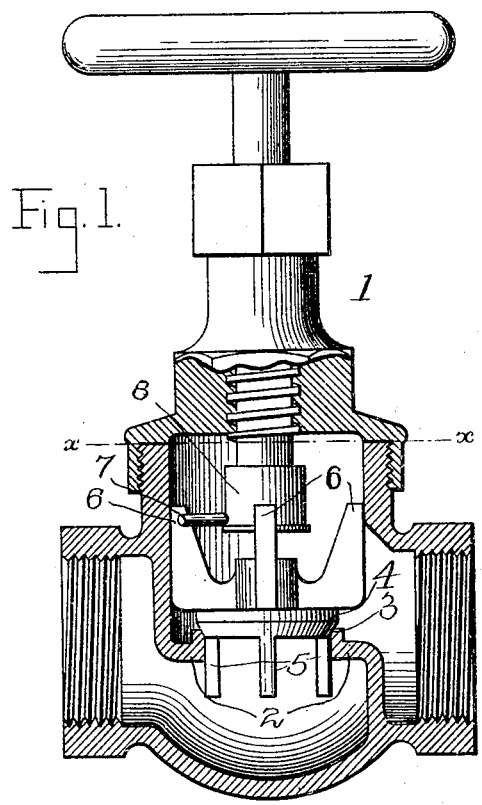

W. B. DAVIS.
COMBINATION VALVE.
APPLICATION FILED MAR. 22, 1910.

979,384.

Patented Dec. 20, 1910.

Witnesses
Ernest F. Hutchinson
M. E. Shook

Inventor
Walter B. Davis
By Edson Bros.
Attorneys

UNITED STATES PATENT OFFICE.

WALTER B. DAVIS, OF AURORA, ILLINOIS.

COMBINATION-VALVE.

979,384.

Specification of Letters Patent. Patented Dec. 20, 1910.

Application filed March 22, 1910. Serial No. 550,870.

*To all whom it may concern:*

Be it known that I, WALTER B. DAVIS, a citizen of the United States, residing at Aurora, in the county of Kane and State of Illinois, have invented certain new and useful Improvements in Combination-Valves; and I do hereby declare the following to be a full, clear, and exact description of the invention, such as will enable others skilled in the art to which it appertains to make and use the same.

My invention relates to valves, particularly to an improved combination check and globe valve intended to take the place of these two separate valves where they are used together in connecting up the pipes of steam and hot water boilers and heating systems. My combination valve may also be used to advantage in connecting water feed pipes with boilers.

The uses of my invention are many, but it is more particularly designed for steam boilers and steam heating systems, especially for connecting radiators or heating coils to the return pipes, also on the feed pipes of boilers. In both of these places, as well as in many others, a check valve and a globe or gate valve are now commonly and properly used. The check valve is to prevent the flow of water from going back into the radiators when the steam is shut off at the inlet to said radiators, as is ordinarily the case. In the feed pipes of boilers, the check valve is used to prevent the water or steam pressure in the boiler from backing up into the mains or the return heating pipes connected thereto. In both of the locations referred to, the globe valve is placed close to the check valve and normally left open, said globe valve being placed between the check valve and the boiler or the return pipe, as the case may be. The two valves are placed in this relative position in order that the globe valve may be used when it is necessary to take the check valve apart for the purpose of removing scale or to repair it when it fails to close automatically. This check valve frequently gets out of order because even tiny bits of scale or dirt will hold them open, and they are, therefore, not to be depended upon when taking apart the pipes leading up to the check valve. The globe valves are consequently used as a precaution to prevent steam fitters from being scalded by water or steam backing up through an inoperative check valve. Said globe valves are also useful for regulating the flow of water to the boiler, etc.

The object of my invention is to combine these two valves in one whereby the space which it occupies is reduced to about one-third of that required by the two valves and their connection. My valve can, therefore, be used in numerous places where there is not sufficient space for the two valves. It may also be noted that the cost of manufacture of my valve is no greater than the ordinary globe valve so that the use of my invention will cut the expense in half as compared with the use of two separate valves for securing the same advantages.

The invention consists in the features of construction and combinations of parts hereinafter described and specified in the claims.

Figure 2:
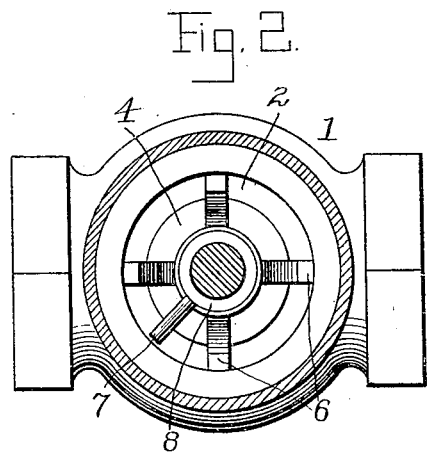

In the accompanying drawing: Figure 1 is a central vertical section through a valve, constructed in accordance with my invention, and Fig. 2 is a sectional view on the line $x$—$x$ of Fig. 1.

The body 1 of the valve is similar to the regular globe or check valve, having the usual partition 2 containing the valve seat 3. The valve disk 4 is provided with a plurality of downwardly projecting fingers 5 which pass through the opening in the partition and serve to guide the disk squarely over said opening to insure the perfect seating or tight closing of the valve. Said valve disk is also provided with a plurality of upwardly projecting fingers 6 which also serve as guides but are principally designed to act as abutments for a radially projecting lug 7 on the end of the valve stem 8. There is no other connection between the valve disk and valve stem except this lug which engages the upwardly extending fingers 6 when the valve stem is turned. The result of this connection is that the valve disk is made to turn with the valve stem whenever the latter is screwed up or down. The disk is, therefore, free to act as a perfect check valve when the valve stem is raised. When, however, said valve stem is turned down, it forces the disk firmly down into its seat and acts just like a globe valve. The turning of the disk with the valve stem, as the latter is screwed down, grinds out any particles of scale or dirt that may have collected on the valve seat and, in case said disk adheres or becomes fixed to its seat, the turning of the valve will free it as the valve stem is screwed up.

While I have illustrated my invention as applied to an ordinary one-way valve casing, it should be understood that it may be applied to any of the other common forms, such as cross-valves, angle-valves and Y-valves. I also do not limit myself to the details of construction herein shown and described but reserve the right to make such changes therein as may fairly fall within the scope of the appended claims.

I claim:

1. The combination, with a valve casing having a partition therein provided with the valve opening, of a valve stem having screw connection with the casing and adapted to move longitudinally in line with said valve opening, a valve made separate from said valve stem and arranged in said opening, said valve being free to act as a check valve when the valve stem is screwed outward, but also acting as a stop valve when said valve stem is screwed inward so as to hold said valve firmly in its opening, fingers arranged on said valve and extending along the lower end of said valve stem, and a radial projection on said valve stem arranged between said fingers on the valve for the purpose specified.

2. The combination, with a valve casing having a partition therein provided with the valve opening, of a valve stem having screw connection with the casing and adapted to move longitudinally in line with said valve opening, a separate valve arranged in said opening, said valve being free to act as a check valve when the valve stem is screwed outward but also acting as a stop valve when said valve stem is screwed inward so as to hold said valve firmly in its opening, guide fingers arranged at intervals around the periphery of said valve and extending upwardly around the lower end of said valve stem, and a radial projection on said valve stem arranged between two of said upwardly extending fingers on the valve for the purpose specified.

3. The combination, with a valve casing having a partition therein provided with the valve opening, of a valve stem having screw connection with the casing and adapted to move longitudinally in line with said valve opening, a separate valve arranged in said opening, said valve being free to act as a check valve when the valve stem is screwed outward but also acting as a stop valve when said valve stem is screwed inward so as to hold said valve firmly in its opening, downwardly extending guide fingers on said valve, guide fingers arranged at intervals around the periphery of said valve and extending upwardly around the lower end of said valve stem, and a radial projection on said valve stem arranged between two of said upwardly extending fingers on the valve for the purpose specified.

In testimony whereof, I affix my signature, in presence of two witnesses.

WALTER B. DAVIS.

Witnesses:
H. J. COOPER,
R. H. ROBINSON.